United States Patent [19]

Guest

[11] Patent Number: 4,804,213

[45] Date of Patent: Feb. 14, 1989

[54] TUBE COUPLINGS

[76] Inventor: John D. Guest, "Iona" Cannon Hill Way, Bray, Maidenhead, Berkshire, United Kingdom

[21] Appl. No.: 79,358

[22] Filed: Jul. 30, 1987

[30] Foreign Application Priority Data

Jul. 30, 1986 [EP] European Pat. Off. ........ 86305882.2

[51] Int. Cl.⁴ ............................................. F16L 37/08
[52] U.S. Cl. ...................................... 285/308; 285/320; 285/322
[58] Field of Search ................ 285/322, 323, 308, 317, 285/320, 314

[56] References Cited

U.S. PATENT DOCUMENTS

| | | | |
|---|---|---|---|
| 2,523,770 | 9/1950 | Marette | 285/317 X |
| 3,503,637 | 3/1970 | Maeshiba | 285/317 X |
| 4,005,883 | 2/1977 | Guest | 285/322 |
| 4,573,716 | 3/1986 | Guest | 285/323 |
| 4,601,497 | 7/1986 | Bartholomew | 285/314 |
| 4,657,286 | 4/1987 | Guest | 285/323 |

Primary Examiner—Dave W. Arola
Attorney, Agent, or Firm—Albert L. Jeffers; John F. Hoffman

[57] ABSTRACT

The disclosure relates to a tube coupling having a body with a throughway open at one or both ends to receive a tube. A collet is located in the throughway and a plurality of resilient fingers which engage an internal cam surface tapering in one direction towards said one end of the throughway to compress the fingers against the tube to grip and hold the tube when the collet is drawn in said one direction with the tube. An end of the collet projects from the throughway and can be depressed into the throughway to release a tube therefrom and an end cap is detachably mounted on the body to cover said open end of the throughway. The end cap has manually operable radially movable presser members for engaging the end of the collet projecting from the throughway for urging the collet into the throughway to release a tube from the body.

14 Claims, 2 Drawing Sheets

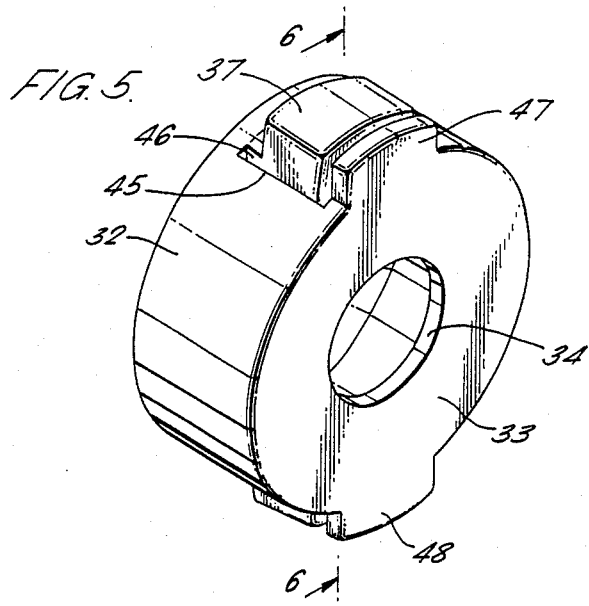
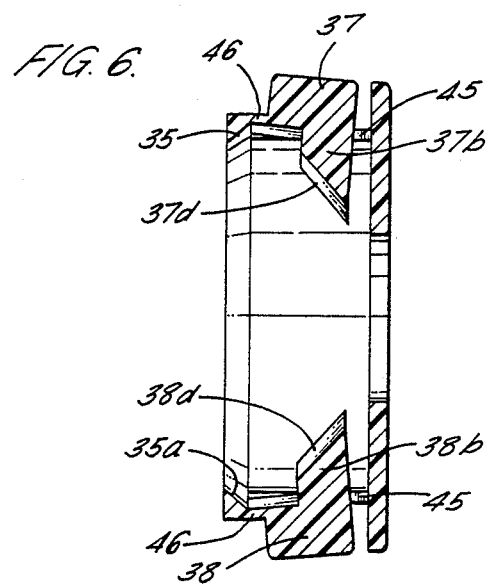

TUBE COUPLINGS

BACKGROUND OF THE INVENTION

1. Field of the Invention

This invention relates to tube couplings.

2. Background Prior Art

U.K. Patent Publication No. 2132296 discloses a tube coupling having a body part with a bore containing an axially tapered portion co-operating with arms of a collet extending into the bore, the tapered portion being such that axially outward movement of the collet arms to be pressed inwardly to grip a tube in the bore, wherein there is provided an end cover extending around the axially outer end of the collet and adapted to engage resiliently a part of the coupling body, the end cover having an aperture portion through which the tube can extend into the collet, said end cover and coupling body further having mutually engaging portions limiting axially inward movement of the end cover so as to prevent the collet being pressed inwardly to release the tube by pressure on the end cover and the end cover and coupling body being shaped so that the end cover can be disengaged from the body by an axially outward pull.

Whilst that arrangement provides adequate protection for the collet against inadvertent release of a tube from the coupling body, it does also prevent ready intentional release of a tube from the coupling body when required since the end cap must first be detached from the coupling body.

SUMMARY OF THE INVENTION

This invention provides a tube coupling comprising a body having a throughway open at one end to receive a tube, a sleeve in the throughway projecting from said one end of the throughway, and through which a tube may extend into the throughway, gripping means in the throughway arranged to be releasable by depressing the projecting end of the sleeve into the throughway to allow a tube to be withdrawn from the body and an end cap detatchably mounted on the body to cover said open end of the throughway, the end cap having a aperture through which a tube can extend into the throughway and having manually operable means for engaging the projecting end of the sleeve to depress the sleeve into the throughway and thereby release the tubing, gripping means to allow the tube to be withdrawn.

By way of example the sleeve and gripping means may comprise a collet extending into one end of the throughway, and having a plurality of resilient fingers extending along the throughway, and the throughway may have an internal cam surface tapering in one direction towards said one end thereof to compress the fingers against a tube within the collet to grip and hold the tube when the collet is drawn towards said one end of the throughway and to release the tube when the collet is depressed into the throughway by said means on the end cap.

This invention also provides a tube coupling comprising a body having a throughway open at one end to receive a tube, a collet in said one end of the throughway through which a tube may extend into the throughway, the collet having a plurality of resilient fingers and the throughway having an internal cam surface tapering in one direction towards said one end of the throughway to compress the fingers against the tube to grip and hold the tube when the collet is drawn in said one direction with the tube, the collet having an end part which projects from said one end of the throughway to release a tube therefrom and an end cap detachably mounted on the body to cover said open end of the throughway, the end cap having an aperture thorugh which a tube can extend into the throughway and having manually operable means for engaging the end of the collet projecting from the throughway for urging the sleeve into the throughway to release a tube from the body.

The cap may have a skirt closed at one end by an end wall having an aperture through which a tube may extend and adapted at the other end to mount on the body and the manually operable release means are mounted on the skirt of the cap.

In a preferred construction the manually operable release means comprise a presser member or members extending through the skirt, the or each member having a cam face at the end within the skirt to engage said projecting end of the collet and having an end projecting outwardly of the skirt to which pressure may be manually applied to force the member inwardly to cause the cam surface thereof to engage and depress the collet end inwardly into the throughway of the body.

More specifically two presser members may be provided at opposite locations around the skirt.

Furthermore the or each presser member may be formed integrally with the wall of the skirt and the skirt may have a pair of slots extending around the skirt by the side of the presser member to provide webs supporting the presser member between the slot, the webs being resilient flexible to permit the presser member to be depressed inwardly of the skirt to act on the collet.

In a further construction, the or each presser member is mounted in cantilever manner in the wall of the skirt.

In a preferred construction, the cam face at the inner end of the presser member may be formed by an angled face between the side of the presser member adjacent the open end of the throughway and the inner end of the presser member to bear against the end of the sleeve projecting from the throughway.

Also in a preferred construction the inner end of the presser member may be concavely curved to fit around the tube within the end cap when the presser member is depressed inwardly to act on the sleeve.

In any of the above arrangements the open end of the cap may be formed with an inwardly projecting lip around its inner periphery to engage in a corresponding groove in the outer periphery of the body to locate the cap on the body with the end wall of the cap spaced from the end of the body.

In addition the upstanding projection may be formed on the end cap adjacent the or each pressor member to protect the latter against inadvertent operation.

BRIEF DESCRIPTION OF THE DRAWINGS

FIGS. 5 and 6 illustrate a further embodiment of the end cap.

DESCRIPTION OF THE PREFERRED EMBODIMENTS

Figure 1:
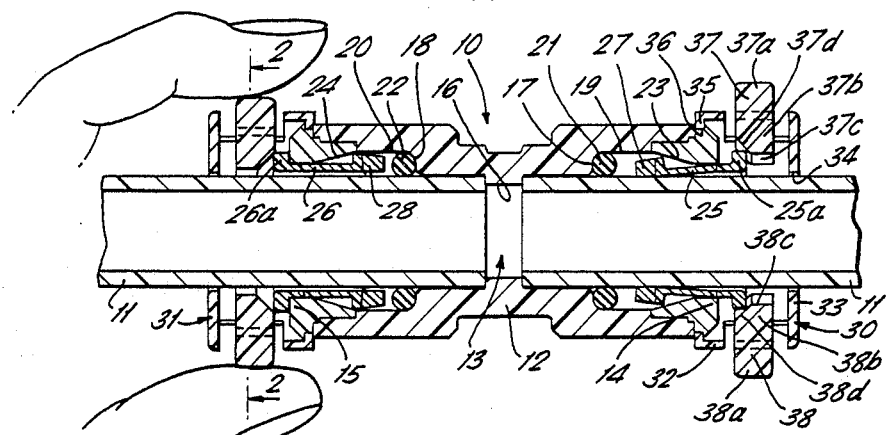
FIG. 1 is a sectional view through a double ended tube coupling for a pair of tubes having end caps with means for release of the tube.

Referring to FIG. 1, there is shown a double ended coupling body 10 for effecting a coupling between two lengths of tubing 11. The coupling comprises an injection moulded plastics hollow generally tubular body 12 having a central throughway 13 and open ends 14 and 15. Midway along the throughway 13 the body has an integral annular wall 16 encircling the throughway to define a stop against which the ends of the tubes 11 inserted from either end of the throughway engage. Partway along the throughway from the annular wall 16 towards each end 14, 15 of the throughway, the wall of the throughway is stepped out at 17, 18 to form enlarged bores 19, 20 extending towards the open ends 14, 15 of the throughway. The steps or shoulders 17, 18 thus formed in the bore face towards the open end 14, 15 of the throughway. Annular resilient seals 21, 22 are disposed in the enlarged bores 19, 20 against the shoulders 17, 18 to seal with the outer surfaces of the tubes inserted into the throughway.

Adjacent the ends 14, 15 of the body 12 the throughway is formed with tapering cam surfaces 23, 24 reducing towards the end of the body and collets 25, 26 are disposed in the ends of the body and formed with metal insert grips partway along the inner sides of the fingers for gripping the tubes which extend through the collets. The resilient fingers of the collets are compressed in engagement with the tubes extending through the collets by engagement with the tapering cam surfaces 23, 24 by movement of the collets outwardly of the coupling body to lock the tubes in the throughway.

The collets 25, 26, extending outwardly of the open ends 14, 15 of the coupling body and the ends of the collets are formed with radially outwardly extending heads 25a, 26a. In order to release the tubes from the coupling, the collets are pressed inwardly by pressure on the heads 25a, 26a to relese the camming action of the cam surfaces 23, 24 on the resilient fingers 27, 28 and with the collet held inwardly, the tubes 11 can then be withdrawn.

In order to prevent accidental release of the tube, end covers 30, 31 are provided. Each cover comprises a cylindrical skirt 32 having an end wall 33 at one end thereof with an aperture 34 through which a respective tube 11 extends. The other end of the skirt extends around an outer end of the coupling body and has a radially inturned flange 35 which engages in an encircling groove 36 on the body. Each cap is thus detachably held on the body and the skirt is so dimensioned that the end wall 33 of the cap is spaced well clear of the head of the collet projecting from the adjacent end of the throughway.

The skirt of each cap is formed with integral radially extending presser members 37, 38 at diametrically spaced locations across the cap which have parts 37a, 38a extending radially outwardly of the skirt of the cap and parts 37b, 38b extending radially inwardly of the cap. The latter, inwardly extending parts have concavely curved ends 37c, 38c shaped to extend around the tube 11 passing through the cap. The corners of the inwardly extending parts 37b, 38b of the presser members are bevelled between the inner ends 37c, 38c and the sides of the presser members adjacent the ends of the coupling body to provide inclined cam surfaces 37d, 38d to engage the head of the collet 25a, projecting from the adjacent end of the coupling body encircled by the cap.

Figure 2:
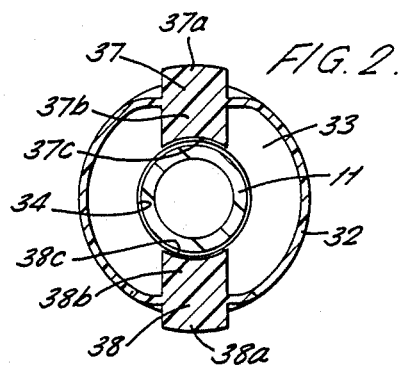
FIG. 2 is a sectional view taken on FIG. 1 on the line 2—2.
Figure 3:
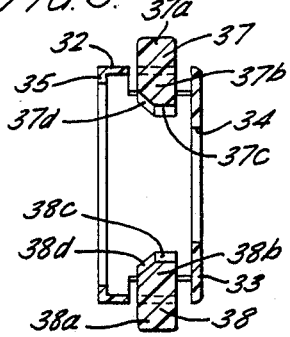
FIG. 3 is a sectional view of one of the end body to lock the tubes in the throughway.
Figure 4:
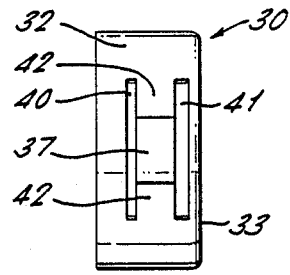
FIG. 4 is a plan view of the end cap.

On either side of the presser members 37, 38, the wall of the skirt is formed with elongage slots 40, 41 extending around the skirt and beyond each presser member as best seen in FIGS. 2 and 4. The wall of the skirt between adjacent ends of the slots forms webs 42 supporting the presser members and the material of the cap and thickness is such that the webs are resiliently flexible to permit the presser members to be depressed inwardly of the cap by radial pressure on the outer ends of the presser members 37, 38 as depicted in the left hand part of FIG. 1. Forcing the presser members radially inwardly engages the inclined cam surfaces 37d, 38d with the enclosed head 25a, 26a of the collet to press the collet axially inwardly and thereby to release the gripping action of the resilient fingers on the tube within the collet permitting the tube to be extracted. When inward pressure on the presser members is released, the presser members are restored to their outer positions as illustrated in the right hand end of FIG. 1 and a tube can then be re-inserted in the coupling body and by slight movement outwardly of the body locked in place by the jamming action of the resilient fingers of the collet on the tube as aforesaid.

The arrangement of the invention thus provides protection against inadvertent release of the tube from the coupling body by accidental impact on the end of the collet projecting from the coupling whilst readily permitting release of the tube by actuating the presser members of the cap when it is required to extract the tube.

Reference is now made to FIGS. 5 and 6 of the drawings which illustrate a modified version of the end cap. For the sake of simplicity, like parts have been allotted the same reference numerals as in the previously described embodiment. In the embodiment of FIGS. 5 and 6, the skirt 32 is formed with generally rectangular openings 45 at diametrically spaced locations around the skirt and the presser members 37, 38 are mounted in the openings 45 in cantilever fashion on short webs 46 formed in the skirt wall adjacent the open end of the skirt.

There is a clearance between the periphery of the apertures 45 and the pressure members 37, 38 to provide free movement of the presser members through the apertures. The end wall 33 of the skirt has raised lugs 47, 48 disposed opposite the presser members 37, 38 to provide some protection against accidental operation of the presser members.

In the embodiment of FIGS. 1 to 4, the bevelled faces 37d, 38d on the inner edges of the presser members terminated in end faces 37°, 38°. In the embodiment of FIGS. 5 and 6, the bevelled faces 37d, 38d extend fully across the inner ends of the presser members. Finally, the in-turned lip or flange 35 around the open end of the skirt 32 has an inclined inner face 35a as shown in FIG. 6 to facilitate removal of the end cap from the coupling body.

In the above described embodiments the tube is gripped in the body member of the tube coupling by means of a collet having resilient arms which are pressed against the tube by a tapered cam surface on the body. Other gripping devices may however be utilised for holding the tube and a sleeve provided in the throughway projecting from the open end thereof to receive the tube and arranged to release the gripping action by depressing the sleeve into the coupling body by means of the presser members on the end cap.

I claim:

1. A tube coupling comprising a body having a throughway open at one end to receive a tube, a sleeve mounted in the throughway at said one end and projecting from the open end of the throughway, and through which a tube may extend into the throughway, tube gripping means in the throughway for receiving and engaging a tube to hold the tube in the throughway, said sleeve being arranged to release the gripping means from a tube by axially depressing the projecting end of the sleeve into the throughway to allow a tube to be withdrawn from the body, and an end cap detachably mounted on the body to cover said open end of the throughway, the end cap having an aperture through which a tube can extend into the throughway and having radially directed manually operable means acting on the projecting end of the sleeve to depress the sleeve axially into the throughway and thereby release the tube gripping means to allow the tube to be withdrawn.

2. A tube coupling as claimed in claim 1, wherein the sleeve and gripping means comprise a collet through which a tube may pass located in said one end of the throughway, the collet having a plurality of radially movable resilient fingers extending along the throughway, and the throughway has an internal cam surface tapering in one direction towards said one end with which the resilient fingers are engageable to compress the fingers radially inwardly against a tube within the collet with movement of the collet in said one direction with respect to the cam surface to grip and hold the tube when the collet is drawn towards said one end of the throughway and to release the tube when the collet is depressed axially into the throughway by said means on the end cap.

3. A tube coupling comprising a body having a throughway open at one end to receive a tube, a collet in said one end of the throughway through which a tube may extend into the throughway, the collet having a plurality of resilient fingers and the throughway having an internal cam surface disposed in facing relationship with said fingers and tapering in one direction towards said one end of the throughway and which can be depressed in a direction axially outwardly of the throughway to engage and compress the fingers against the tube to grip and hold the tube when the collet is drawn in said one direction with the tube against said cam surface, the collet having an end part which projects from said one end of the throughway to disengage from said cam surface and release a tube therefrom, and an end cap detachably mounted on the body to cover said open end of the throughway, the end cap having an aperture through which a tube can extend into the throughway and having radially directed manually operable means for engaging the end of the collet projecting from the throughway for urging the collet axially into the throughway to release a tube from the body.

4. A tube coupling as claimed in claim 3, wherein the cap is formed with an inwardly projecting lip around its inner periphery to engage in a corresponding groove in the outer periphery of the body to locate the cap on the body with the end wall of the cap spaced from the end of the body.

5. A tube coupling as claimed in claim 3, wherein the end cap is formed with an upstanding projection to one side of said at least one presser member to protect the presser member against inadvertent depression.

6. A tube coupling as claimed in claim 5, wherein the raised projection is formed by an extension of an end wall opposite said at least one presser member.

7. A tube coupling as claimed in claim 3, wherein the cap has a skirt closed at one end by an end wall having an aperture through which a tube may extend and adapted at the other end to mount on the body and the manually operable release means are mounted on the skirt of the cap.

8. A tube coupling as claimed in claim 7, wherein the cam surface at the inner end of the presser member is formed by an angled face between the side of the presser member adjacent the open end of the throughway and the inner end of the presser member to bear against the end of the sleeve projecting from the throughway.

9. A tube coupling as claimed in claim 7, wherein the manually operable release means comprise at least one presser member extending through the skirt, said at least one member having a cam face at the end within the skirt to engage said projecting end of the sleeve and having an end projecting outwardly of the skirt to which pressure may be manually applied to force the member inwardly to cause the cam surface thereof to engage and depress the sleeve axially inwardly into the throughway of the body.

10. A tube coupling as claimed in claim 9, wherein two presser members are provided at opposite locations around the skirt.

11. A tube coupling as claimed in claim 9, wherein said at least one presser member is formed integrally with the wall of the skirt and the skirt has a pair of slots extending around the skirt by the side of the presser member to provide webs supporting the presser member between the slot, the webs being resiliently flexible to permit the presser member to be depressed inwardly of the skirt to act on the collet.

12. A tube coupling as claimed in claim 11, wherein said at least one presser member is mounted in cantilever manner in the wall of the skirt.

13. A tube coupling as claimed in claim 12, wherein the cantilever is formed by a portion of the skirt between the presser member and the open end of the skirt.

14. A tube coupling as in one of claims 8–13, wherein the inner end of the presser member is concavely curved to fit around the tube within the end cap when the presser member is depressed inwardly to act on the sleeve.

* * * * *